United States Patent
Sasaki et al.

(10) Patent No.: US 10,859,026 B2
(45) Date of Patent: Dec. 8, 2020

(54) CONTROL DEVICE OF FUEL PUMP

(71) Applicant: HONDA MOTOR CO., LTD., Tokyo (JP)

(72) Inventors: Shoji Sasaki, Wako (JP); Kazunori Kawamura, Wako (JP); Kazuhiro Kobayashi, Wako (JP); Akira Kobayashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/210,758

(22) Filed: Dec. 5, 2018

(65) Prior Publication Data
US 2019/0170079 A1    Jun. 6, 2019

(30) Foreign Application Priority Data
Dec. 5, 2017    (JP) .................. 2017-233278

(51) Int. Cl.
*F02D 41/30*    (2006.01)
*B60W 10/06*    (2006.01)
(Continued)

(52) U.S. Cl.
CPC ......... *F02D 41/3082* (2013.01); *B60W 10/06* (2013.01); *F02D 41/22* (2013.01); *F02M 37/08* (2013.01); *F02D 41/221* (2013.01); *F02D 41/266* (2013.01); *F02D 2200/06* (2013.01); *F02M 2037/085* (2013.01)

(58) Field of Classification Search
CPC .... F02D 41/22; F02D 41/3082; F02D 41/221; F02D 41/266; F02D 2200/06; B60K 28/14; B60W 10/06; F02M 37/08; F02M 2037/085

USPC ....... 123/446, 447, 456, 457, 497, 510, 511, 123/481, 198 D, 198 DB, 198 DC; 701/107, 103–105
See application file for complete search history.

(56) References Cited

U.S. PATENT DOCUMENTS

| | | | | |
|---|---|---|---|---|
| 4,901,701 A * | 2/1990 | Chasteen | ................ | F02D 37/02 123/478 |
| 7,287,501 B2 * | 10/2007 | Yamada | ................ | F02D 41/042 123/179.4 |
| 8,666,639 B2 * | 3/2014 | Saruwatari | ............. | F02D 41/22 701/107 |

FOREIGN PATENT DOCUMENTS

JP    2016-84739 A    5/2016

OTHER PUBLICATIONS

Office Action dated Sep. 2, 2020, issued in counterpart Chinese Application No. 2018114716848, with English translation (11 pages).

* cited by examiner

*Primary Examiner* — Hai H Huynh
*Assistant Examiner* — Gonzalo Laguarda
(74) *Attorney, Agent, or Firm* — Westerman, Hattori, Daniels & Adrian, LLP

(57) ABSTRACT

In the communication interruption state in which the transmission of a drive control command value DUTY from an engine control unit (ECU) 1 to a fuel pump driver (FPD) 2 is disabled, the FPD 2 is configured so as to drive a fuel pump 4 by using the maximum command value DTYMAX (100%) as a drive control command value DUTY. A stop state of the fuel pump 4 is maintained even if the drive control command value DUTY is the maximum command value DTYMAX when an ignition switch 21 is in the OFF State so as to have stopped the fuel pump 4, while the fuel pump 4 is driven when the ignition switch 21 is in the ON (Continued)

state and the drive control command value DUTY is the maximum command value DTYMAX.

6 Claims, 4 Drawing Sheets

(51) Int. Cl.
*F02M 37/08* (2006.01)
*F02D 41/22* (2006.01)
*F02D 41/26* (2006.01)

CONTROL DEVICE OF FUEL PUMP

CROSS-REFERENCE OF RELATED APPLICATION

This application claims priority of Japanese Patent Application No. 2017-233278 filed in Japan on Dec. 5, 2017, the entire contents of which are incorporated herein by reference.

TECHNICAL FIELD

The present invention relates to a control device or a system including a fuel pump for supplying fuel within a fuel tank into an internal combustion engine, and more particularly, to the control device which is provided with an engine control unit for controlling the internal combustion engine and a fuel pump driver for controlling operation of the fuel pump, and in which the engine control unit transmits a drive control command value to the fuel pump driver so as to allow the fuel pump driver to control the operation of the fuel pump based on the transmitted drive control command value.

BACKGROUND OF THE INVENTION

In Japanese Patent application Laid-Open Publication No. 2016-084739, there is shown a fuel pump control device which controls operation of a fuel pump for supplying fuel into an internal combustion engine for driving a vehicle in accordance with conditions of the vehicle. This fuel pump control device is connected through a communication line (for example, a computer network within a vehicle) to an engine control device which controls the internal combustion engine and performs a drive control of the fuel pump based on a signal transmitted from the engine control device. According to this fuel pump control device, the fuel pump is controlled so as to be stopped at the same time when it has been determined that a condition of the vehicle is in an idle state or in an idle stop state, and the fuel pump is controlled so as to be started at the same time when it has been determined that the condition of the vehicle switched over from the idle state to a travelling state.

In a communication interruption state in which communication between two control devices is interrupted due to disconnection of a communication line provided between the fuel pump control device (fuel pump driver) and the engine control device, or the like, the above mentioned stop and start of the fuel pump are not performed normally. An abnormal state in which the fuel pump is stopped at the time to be operated or an abnormal state in which the fuel pump continues to be operated at the time to be stopped is assumed. The patent reference 1 does not have any description of processing corresponding to the fail safe in the case of having caused such communication interruption state.

There is a need to provide a control device which comprises an engine control unit and a fuel pump driver, and in which the fail safe correspondence processing is performed properly at the time of occurrence of the failure in a control device of a fuel pump so as to be able to avoid accurately the above mentioned abnormal states.

SUMMARY OF INVENTION

According to a first embodiment of the present invention, a control device of a fuel pump (4) for supplying fuel within a fuel tank (5) to an internal combustion engine (3), comprises an engine control unit (1) for controlling the engine, and a fuel pump driver (2) for controlling supply of an electrical power source to the fuel pump, wherein the engine control unit (1) transmits a drive control command value (DUTY) to the fuel pump driver (2), and the fuel pump driver (2) controls operation of the fuel pump (4) based on the transmitted drive control command value (DUTY), wherein the fuel pump driver (2) is configured to drive the fuel pump (4) by using a specific drive command value (DTYMAX) prefixed as the drive control command value (DUTY) in a communication interruption state in which transmission of the drive control command value (DUTY) is interrupted, and wherein a stop state of the fuel pump (4) is maintained even if the drive control command value (DUTY) becomes the specific drive command value (DTYMAX) when an ignition switch (21) for switching connection and disconnection of the electrical power source to the engine control unit (1) is in an OFF state thereby to stop the fuel pump (4), and the fuel pump (4) is driven when the ignition switch (21) is in an ON state and when the drive control command value (DUTY) is the specific drive command value (DTYMAX).

With this configuration, in the communication interruption state in which the transmission of the drive control command value from the engine control unit to the fuel pump driver is interrupted, the fuel pump driver is configured so as to drive the fuel pump by using the specific drive command value prefixed as the drive control command value. The stop state of the fuel pump is maintained even if the drive control command value becomes the specific drive command value when an ignition switch is in the OFF state so as to have stopped the fuel pump, while the fuel pump is driven when the ignition switch is in the ON state and when the drive control command value is the specific drive command value. Accordingly, since the fuel pump is driven when the ignition switch is in the ON state in the case where the drive control command value is the specific drive command value, the state in which the engine cannot be operated can be avoided even if the communication line for transmitting the drive control command value is disconnected. On the other hand, since the stop state of the fuel pump is maintained even if the drive control command value is the specific drive command value when the ignition switch is turned OFF, the useless drive of the fuel pump can be prevented. For example, when an ON sticking failure of an electrical power source relay has occurred in the case where the electrical power source relay is provided between the fuel pump driver and the electrical power source, the electrical power source supply to the fuel pump driver is continued even if the ignition switch is turned OFF, so that it is assumed that the drive control command value becomes the specific drive command value. However, since the stop state of the fuel pump is maintained even in such a case, the fuel pump is prevented from being uselessly driven.

According to a second embodiment of the invention, in the control device of the fuel pump as defined in the first embodiment, when stopping the fuel pump (4), the engine control unit (1) sets the drive control command value (DUTY) to a stop command value (DTY01, DTY02) and sets the stop command value (DTY02) when the ignition switch (21) is in the ON state to a different value from a stop command value (DTY01) when the ignition switch (21) is in the OFF state.

According to this configuration, since the drive control command value is set to the stop command value when stopping the fuel pump, and since the stop command value when the ignition switch is in the ON state is set to the value different from the stop command value when the ignition switch is the OFF state, the fuel pump driver can recognize the ON/OFF states of the ignition switch by the values of the stop command value. Therefore, the communication line for a stop command is not required to be provided corresponding to each of the ON/OFF states of the ignition switch.

According to a third embodiment of the invention, in the control device of the fuel pump as defined in the first or second embodiment, the engine control unit (1) sets the drive control command value (DUTY) to a start command value (DTY2) different from the stop command value (DTY01, DTY02) and the specific drive command value (DTYMAX) when starting the fuel pump (4) from a stop state.

According to this configuration, when starting the fuel pump from the stop state, the drive control command value is set to the start command value different from the stop command value and the specific drive command value. The starting of the fuel pump can be properly performed by providing such start command value, depending on the situation, even after the stop command has been performed.

According to a fourth embodiment of the invention, in the control device of the fuel pump as defined in the third embodiment, the start command value (DTY2) is a command value that maximizes a rotational speed of the fuel pump (4).

According to this configuration, since the start command value is the command value that maximizes the rotational speed of the fuel pump, the fuel pump can be started with a good responsiveness at the time of starting.

According to a fifth embodiment of the invention, in the control device of the fuel pump as defined in any one of the first to fourth embodiments, the engine control unit (1) sets the drive control command value (DUTY) to a first stop command value (DTY01) immediately after the ignition switch (21) is switched over from the ON state to the OFF state, and the fuel pump driver (2) recognizes that the ignition switch (21) is in the OFF state when having received the first stop command value (DTY01), and maintains the stop state of the fuel pump (4) even if the drive control command value (DUTY) is the specific drive command value (DTYMAX).

According to this configuration, since the fuel pump driver can recognize that the ignition switch is in the OFF state when having received the first stop command value, the useless drive of the fuel pump can be prevented by continuing the stop state of the fuel pump even if the drive control command value is the specific drive command value.

According to a sixth embodiment of the invention, in the control device of the fuel pump as defined in the fifth embodiment, the engine control unit (1) sets the drive control command value (DUTY) to a second stop command value (DTY02) different from the first stop command value (DTY01) when the ignition switch (21) is in the ON state and when the engine (3) has been stopped, the fuel pump driver (2) stops the fuel pump (4) when having received the second stop command value (DTY02) and, thereafter, starts the fuel pump (4) when having received a start command value (DTY2) different from the first stop command value (DTY01), the second stop command value (DTY02), and the specific drive command value (DTYMAX).

According to this configuration, since the drive control command value is set to the second stop command value different from the first stop command value when the ignition switch is the ON state and when the engine has been stopped, namely, when an idling stop has been performed, the fuel pump driver recognizes that the engine has been stopped temporarily in the ON state of the ignition switch when having received the second stop command value, thereby to stop the fuel pump, so that electrical power consumption can be reduced. Then, it recognizes that the engine has been re-started when having received the start command value which is different from the first stop command value, the second stop command value, and the specific drive command value, so that the fuel pump can be started simultaneously with the re-start of the engine.

According to a seventh embodiment of the invention, the control device as defined in any one of the first to sixth embodiments further comprises a fuel pump electrical power source relay (11) which is switched ON and OFF corresponding to ON/OFF states of the ignition switch (21), wherein the ignition switch (21) is arranged between a battery (8) and the engine control unit (1), and the fuel pump electrical power source relay (11) is arranged between the battery (8) and the fuel pump driver (2).

With this configuration, since the fuel pump electrical power source relay is provided separately from the ignition switch, the ON/OFF states of an electrical power source supply can be controlled without increasing the capacity of electrical current (the maximum allowable current) of the ignition switch even in the case where a fuel pump driving current has increased, by forming a motor driving the fuel pump by a brushless motor. As a result, an increase in cost can be avoided. Generally, a circuit configuration in which the ignition switch and the fuel pump electrical power source relay are connected in series, and in which the fuel pump can be stopped, for example, by turning the ignition switch OFF even when an ON sticking failure of the fuel pump electrical power source relay has occurred is adopted. Therefore, in the case where a driving current (fuel pump driving current) of the motor driving the fuel pump has increased, the electrical current capacities of the ignition switch and the fuel pump electrical power source relay are required to be increased. On the contrary, according to the configuration of the seventh embodiment, since the ignition switch is arranged on the outside of an electrical route extending from the battery through the fuel pump electrical power source relay to the fuel pump driver, the electrical current capacity of the ignition switch is not required to be increased, so that the increase in cost can be avoided.

DETAILED DESCRIPTION OF EMBODIMENTS OF THE INVENTION

Figure 1:
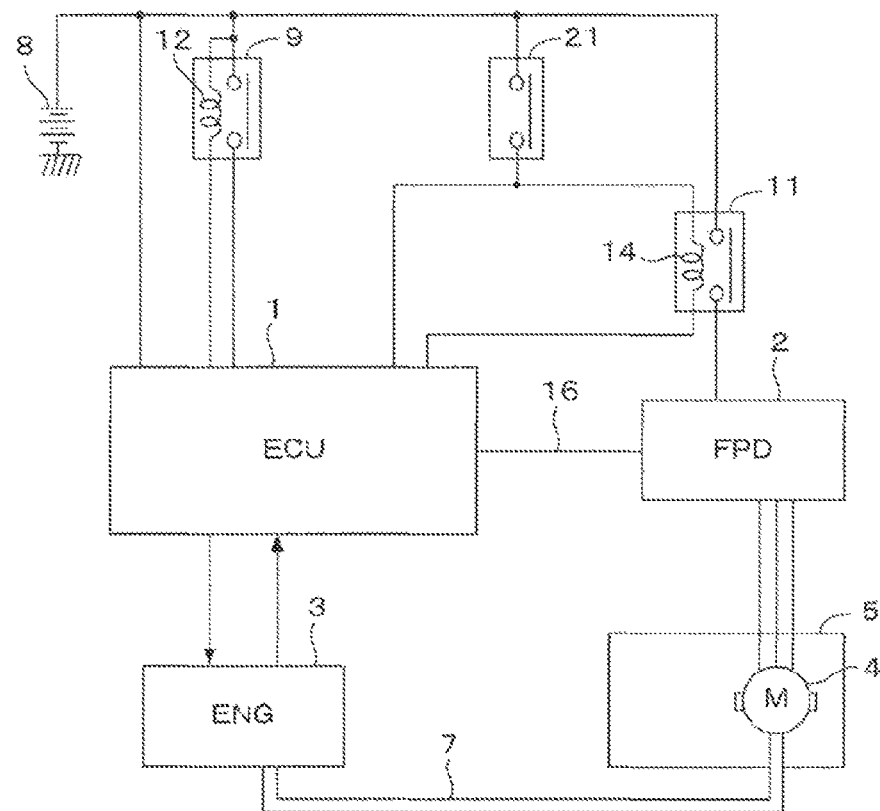
FIG. 1 is a diagram showing the configuration of an internal combustion engine and an essential part of a control device thereof in accordance with an embodiment of the present invention.

Hereinafter, an embodiment of the present invention will be explained with reference to accompanying drawings. FIG. 1 is a diagram showing the configuration of an internal combustion engine and an essential part of a control device thereof in accordance with an embodiment of the present invention. To the internal combustion engine (hereinafter, referred to as "engine") 3, there are fitted engine operation state detection sensors (not shown) such as a rotational speed sensor, a circulating water temperature sensor and the like. Detected signals of these sensors are supplied to an engine control electronic control unit (hereinafter, referred to as "ECU") 1. To the ECU 1, there are connected also an accelerator sensor for detecting a stamping amount of an accelerator pedal (not shown), a vehicle speed sensor for detecting a travelling speed of the vehicle driven by the engine 3, and the like, other than an ignition switch 21. The ECU 1 performs operation control (a fuel supply control, an ignition control) of the engine 3 based on ON/OFF states of the ignition switch 21 and the detection signals of various kinds of sensors.

The fuel is supplied from a fuel tank 5 through a fuel passage 7 to the engine 3. A fuel pump 4 is located in the inside of the fuel tank 5, and operation of the fuel pump 4 is controlled by a fuel pump driver (hereinafter, referred to as "FPD") 2.

The ECU 1 is connected through a main power source relay 9 to a battery 8 functioning as an electric power source, and one end of a drive solenoid 12 of the main power source relay 9 is connected to the battery 8 while the other end thereof is connected to the ECU 1. The ON/OFF states of the main power source relay 9 are controlled by the ECU 1. An electric power supplied through the main power source relay 9 is used mainly for the operation of the ECU 1 itself. The ignition switch 21 that an operator of the vehicle is operable so as to turn ON/OFF is provided between the battery 8 and the ECU 1.

A fuel pump power source relay 11 is provided between the battery 8 and the FPD 2. One end of the drive solenoid 14 of the fuel pump power source relay 11 is connected to the ignition switch 21 while the other end thereof is connected to the ECU 1. Accordingly, a part of the electric power supplied through the ignition switch 21 is applied to an ON operation of the fuel pump power source relay 11 by the drive solenoid 14. The ON/OFF states of the fuel pump power source relay 11 are controlled by the ECU 1.

The FPD 2 is connected through a communication line 16 to the ECU 1, and receives a duty ratio of a pulse signal transmitted from the ECU 1 as the drive control command value DUTY, whereby to perform the drive control of the fuel pump 4 in accordance with the drive control command value DUTY. The FPD 2 supplies three-phase AC drive current which drives a brushless motor in accordance with the drive control command value DUTY, to the brushless motor.

When the ignition switch 21 is switched from the OFF state to the ON state, the ECU 1 turns the main power source 9 and the fuel pump power source relay 11 ON immediately. On the other hand, when the ignition switch 21 has been switched from the ON state to the OFF state, the fuel pump power source relay 11 is turned OFF immediately, and thereafter, the ECU 1 executes output processing of later referred stop command values DTY01, DTU02, a predetermined learning processing and a post processing (for example, which requires time of about two seconds (hereinafter, referred to as "delay time TDLY")) including other calculation processing. Then, the main power source relay 9 is turned OFF.

Herein, although, actually, a fuse is connected to a supply line of the power source in a proper position in the configuration shown in FIG. 1, an illustration is omitted.

Figure 2:
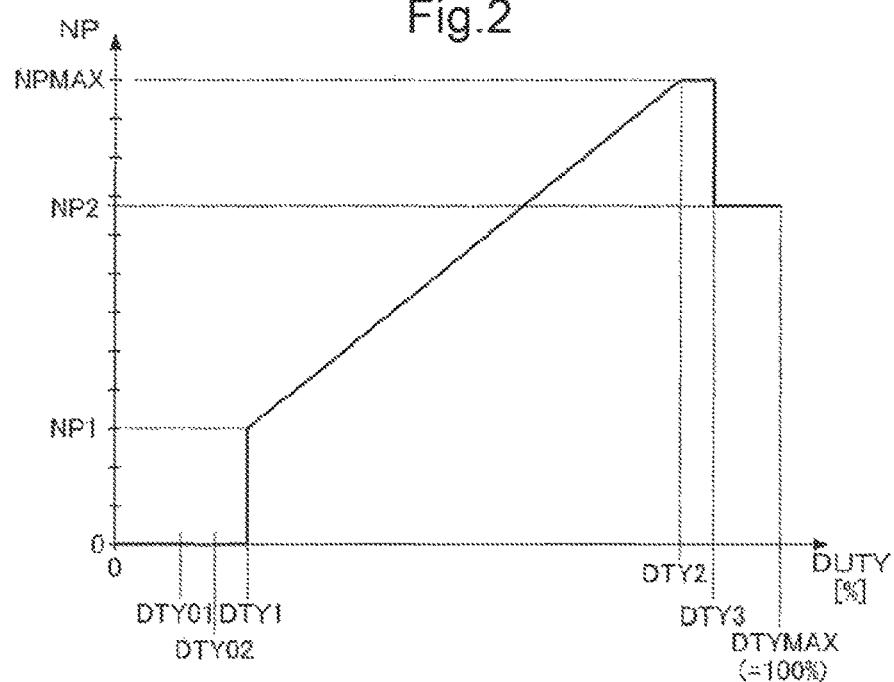
FIG. 2 is a diagram showing a relationship between a drive control command value (DUTY) of a fuel pump and a fuel pump rotational frequency (NP).

FIG. 2 is a diagram showing a relationship between the drive control command value DUTY and the fuel pump rotational frequency NP in accordance with the present embodiment. In this embodiment, the drive control command value DUTY uses a range from a first command value DTY1 which is more than "0" (for example, 20%) to a second command value DTY2 which is less than 100% (for example, 90%) as a command value for ordinary operation. In other words, when the drive control command value DUTY is the first command value DTY1, the fuel pump 4 is driven in such a manner that, in the FPD 2, the fuel pump rotational frequency NP is a first predetermined rotational frequency NP1 (for example, 1000 rpm), while when the drive control command value DUTY is the second command value DTY2, the fuel pump 4 is driven in such a manner that the fuel pump rotational frequency NP is the maximum rotational frequency NPMAX (for example, 15000 rpm). Then, the fuel pump 4 is driven between the first command value DTY1 and the second command value DTY2 such that the fuel pump rotational frequency NP increases in proportion to an increasing amount of the drive control command value DUTY.

Further, a DTY01 and a DTY02 which is less than the first command value DTY1 are used as a first stop command value and a second stop command value, respectively. In other words, when, in the FPD 2, the drive control command value DUTY is the first stop command value DTY01 or the second stop command value DTY02, the fuel pump 4 is stopped. Moreover, when the drive control command value DUTY is set to a value within a range from a third command value DTY3 which is more than the second command value DTY2 and less than 100%, to 100%, the fuel pump 4 is driven such that the fuel pump rotational frequency NP is a second predetermined rotational frequency NP2 (for example, 10000 rpm)

In this embodiment, the FPD 2 is configured such that, in a state that the power source is supplied to the FPD 2 (when the ignition switch 21 is in the ON state, or when the ON sticking failure has occurred in the fuel pump power source relay 11), the FPD 2 recognizes that the drive control command value DUTY is 100% in the case where the communication line 16 has been disconnected. Moreover, when the ignition switch 21 is turned OFF in a state in which the ON sticking failure has occurred in the fuel pump power source relay 11, the drive control command value DUTY is recognized to be 100%, even when the communication line 16 is not disconnected, since the ECU 1 is not operated after the delay time TDLY.

For example, such a configuration is adopted that a connection terminal of the communication line 16 is connected through a pull-up resistor to a power source line in the FPD 2, and a switch element is arranged between a connection line of the communication line 16 and a ground in the ECU 1, so that, when the switch element is turned ON/OFF, a duty ratio variable command signal is transmitted to the FPD 2.

Figure 3:
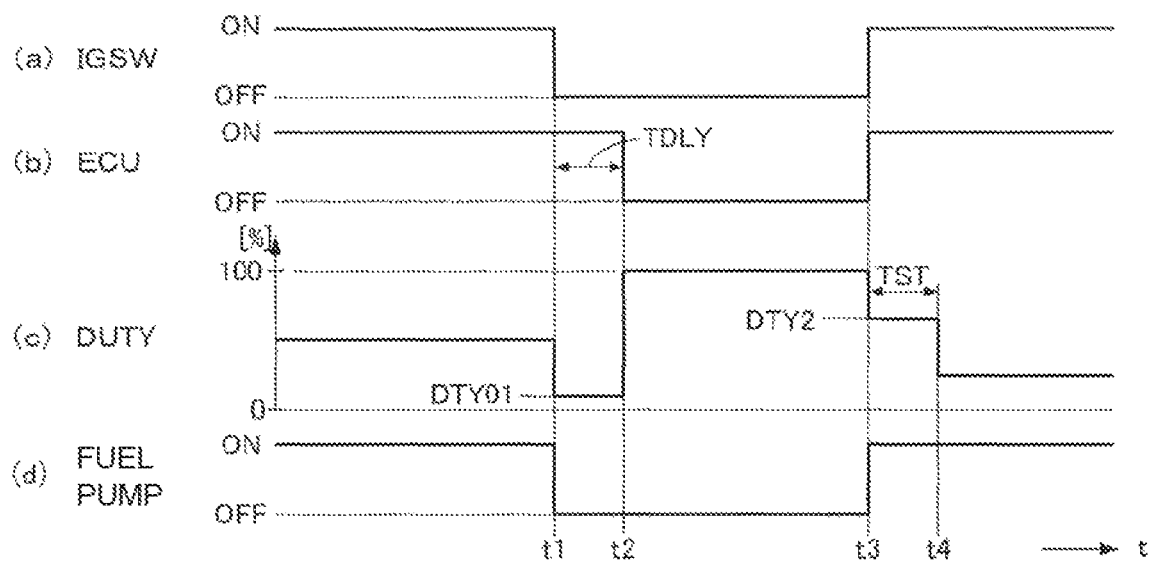
FIG. 3 is a diagram showing a time chart (the control in the case where ON/OFF states of an ignition switch are performed) for explaining an outline of the present invention.
Figure 4:
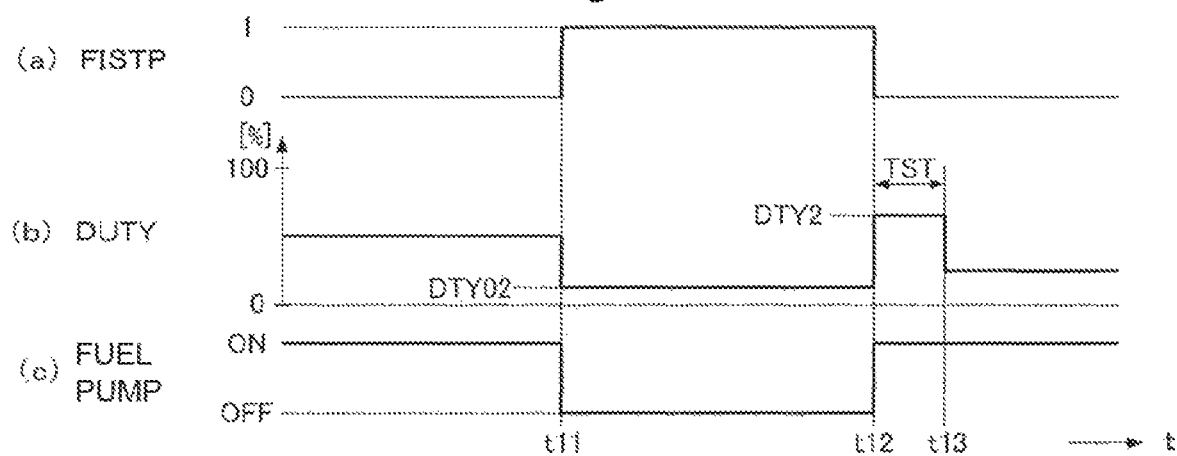
FIG. 4 is a diagram showing a time chart (the control in the case where an idling stop is started and ended) for explaining the outline of the present invention.

FIGS. 3 and 4 are time chars for explaining an outline of the present invention, wherein FIG. 3 correspond to the case where the ignition switch 21 has been switched from the ON state to the OFF state in a state in which the ON sticking failure of the fuel pump power source relay 11 has occurred, and thereafter, it has been switched from the OFF state to the ON state. (a)-(d) of FIG. 3 show transitions with respect to the ON/OFF states of the ignition switch 21, the ON/OFF states of a power source of the ECU 1, the drive control command value DUTY, and an operation state (operation (ON) or stop (OFF)) of the fuel pump 4, respectively.

When the ignition switch 21 is turned OFF in the time t1, the ECU 1 sets the drive control command value DUTY to the first stop command value DTY01. The FPD 2 recognizes a stop command by the OFF of the ignition switch 21 and stops the fuel pump 4 immediately. The ECU 1 turns the main power source 9 OFF at the time t2 after the elapse of the delay time TDLY and is switched to the OFF state of the power source. In an operation example shown in this drawing, when the ECU 1 turns to the OFF state of the power source, due to the occurrence of the ON sticking failure of the fuel pump power source relay 11, the value of the drive control command value DUTY becomes 100% in the same manner as a state in which the communication line 16 has been disconnected. However, the FPD 2 recognizes that the ignition switch 21 has been turned OFF since it receives the first stop command value DTY01, and maintains a stop state of fuel pump 4. In addition, in the case where the ON sticking failure of the fuel pump power source relay 11 does not occur, the stop state of the fuel pump 4 is maintained since the fuel pump power source relay 11 is turned OFF thereby not to supply the power source to the FPD 2 when the ECU 1 switches to the OFF state.

In the time t3, when the ignition switch 21 is turned ON, the power source turns to the ON state and the ECU 1 starts operation and sets the drive control command value DUTY to the second command vale DTY2 corresponding to a start command value from the time t3 to the time t4 when a start time TST elapses. Thereafter, it sets it to the drive control command value DUTY in accordance with a fuel amount to be supplied to the engine 3. The start time TST is the time from the cranking start time of the engine 3 to an execution of a complete explosion determination, and when the engine rotational frequency reaches a complete explosion determination rotational frequency (for example, 400~500 rpm), the complete explosion is determined.

When the FPD 2 recognizes that the drive control command value DUTY is the second command value DTY2, it performs the control to drive the fuel pump 4 at the maximum rotational frequency NPMAX corresponding to the second command value DTY2 in order to start the fuel pump 4 which is stopped, and, after the time t4, performs the control to drive the fuel pump 4 at the rotational frequency NP corresponding to the drive control command value DUTY changed in response to an operation condition of the engine 3.

By this control, when the ignition switch 21 has been turned OFF even if the ON sticking failure of the fuel pump power source relay 11 has occurred, the fuel pump 4 is stopped accurately, and thereafter, when the ignition switch 21 is turned ON, the fuel pump 4 can be started accurately.

FIG. 4 is a time chart for explaining the control in the case of automatic stop of the engine 3 during operation of the vehicle, namely, in the case of execution of an idling stop. (a)~(c) of FIG. 4 show the transitions with respect to an idling stop flag FISTP, the drive control command value DUTY and the operation state of the fuel pump 4.

In the time t11, when a predetermined idling stop execution condition is established, the ECU 1 stops the engine 3 and sets the drive control command value DUTY to the second stop command value DTY02. The FPD 2 recognizes that the idling stop has been started when receiving the second stop command value DTY02, and stops the fuel pump 4.

When the idling stop flag FISTP is returned to "0" in the time t12, the ECU 1 sets the drive control command value DUTY to the second command value DTY2 from the time t12 to the time t13 when the start time TST elapses, so as to re-start the engine 3, and thereafter, the drive control command value DUTY is set in response to the operation condition of the engine 3. When the FPD 2 recognizes that the drive control command value DUTY is the second command value DTY2, it performs the control to drive the fuel pump 4 at the maximum rotational frequency NPMAX corresponding to the second command value DTY2 in order to start the fuel pump 4 which is stopped, and after the time t13, performs the control to drive the fuel pump 4 at the rotational frequency NP corresponding to the drive control command value DUTY changed in response to the operation condition of the engine 3 in order to start the fuel pump 4 which is stopped.

By this control, the fuel pump 4 is stopped accurately during the execution of the idling stop in which the ON state of the ignition switch 21 is maintained and in which the engine 3 is stopped, and the fuel pump 4 can be started accurately at the time of the end of the idling stop (at the time of the re-start of the engine 3).

When the drive control command value DUTY is set to the second command value DTY2 corresponding to the maximum rotational frequency NPMAX at the time of the start of the fuel pump 4, the fuel pump 4 can be started with good responsiveness.

Figure 5:
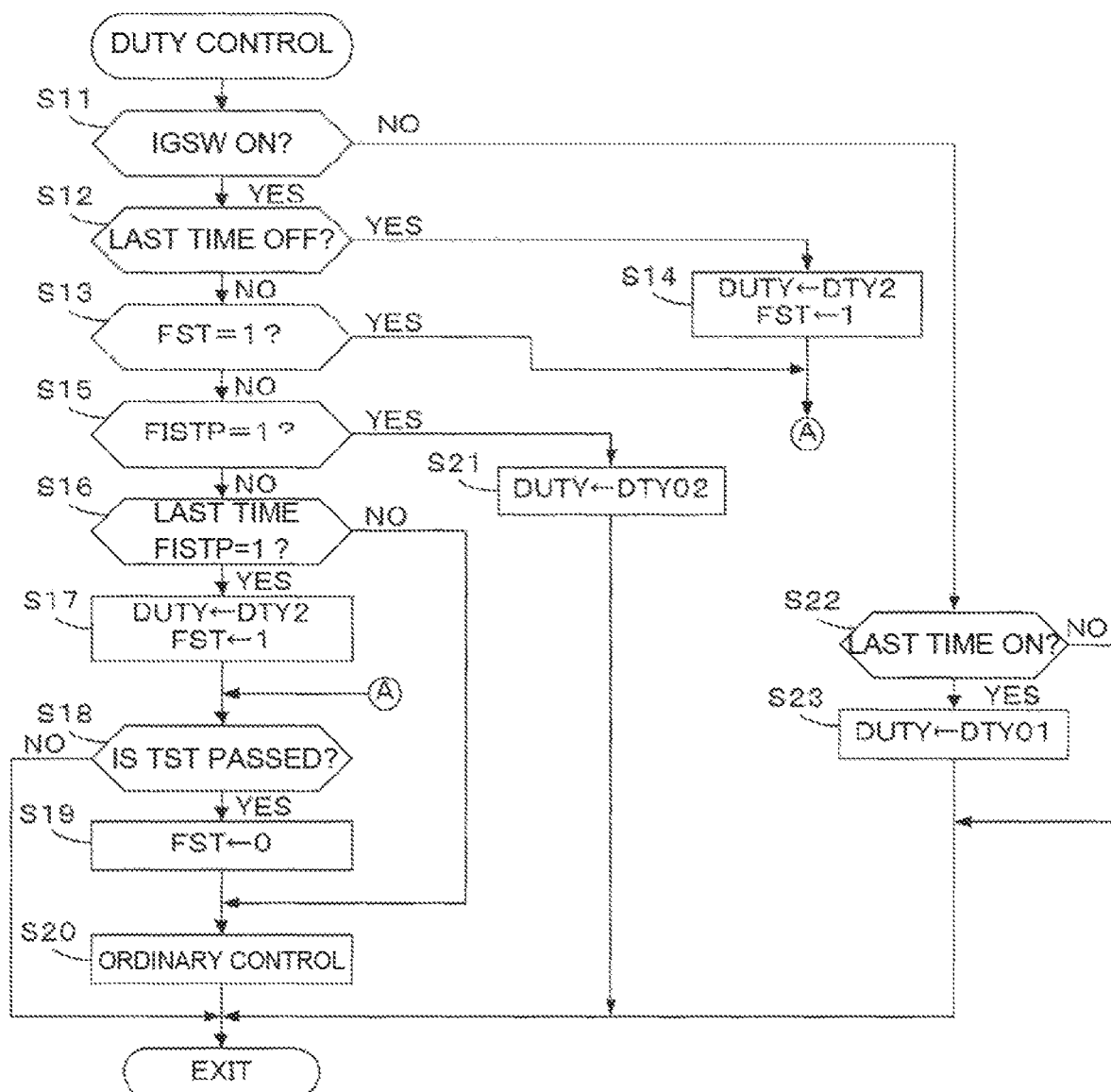
FIG. 5 is a flow chart of the processing calculating a drive control command value (DUTY).

FIG. 5 is a flow chart of processing calculating the drive control command value DUTY, and this processing is executed at every fixed time in the ECU 1.

In a Step S11, whether or not the ignition switch 21 is turned ON is determined. When the answer is an affirmative (YES), whether or not the ignition switch 21 was turned OFF at the time of the last execution of this processing is determined (Step 12). When the answer is a negative (NO) and the ON state is continued, whether or not a starting flag FST is "1" is determined (Step S13). The starting flag FST is set to "1" when starting the fuel pump 4 from the stop state thereof in a Step S14 or a Step 17 to be referred later.

Since, when the ignition switch 21 is in the ON state, the fuel pump 4 is operated except during execution of the idling stop, the starting flag FST is normally "0", and the processing proceeds to a Step S15. In the Step S15, whether or not the idling stop flag FISTP is "1" is determined. When the answer is the affirmative (YES), the drive control command value DUTY is set to the second stop command value DTY02 (Step S21).

When the answer of the Step S15 is the negative (NO), whether or not the idling stop flag FISTP was "1" in the previous time is determined (Step S16). When the answer is the negative (NO), namely, when continuing the state that the idling stop flag FISTP is "0", the processing proceeds to a Step S20, and an ordinary control is executed. In the ordinary control, the drive control command value DUTY is set in such a manner that the fuel pump 4 is operated at the necessary rotational frequency NP in response to the operation condition of the engine 3.

When the answer of the Step S16 is the affirmative (YES), namely, immediately after the idling stop flag FISTP has been switched from "1" to "0", the processing proceeds to the Step S17. Then, the drive control command value DUTY is set to the second command value DTY2 corresponding to the start command value, and the starting flag FST is set to "1". In a Step S18, whether or not the start time TST has elapsed from the time at which the starting flag FST was set to "1" in the Step S17 is determined. The answer first becomes the negative (NO), and the processing is ended. Since the answer of the Step S13 becomes the affirmative (YES) at the time of the next execution, the processing proceeds to a Step S18 immediately. Since the answer of the Step S18 becomes the affirmative (YES) when the start time TST has elapsed, the starting flag FST is returned to "0" (Step S19), and the processing is switched to the ordinary control (Step S20).

When the answer of the Step S12 is the affirmative (YES), namely, immediately after the ignition switch 21 has switched to the OFF state to the ON state, the processing proceeds to the Step 314. Then, the drive control command value DUTY is set to the second command value DTY2 corresponding to the start command value like the Step S17, and the starting flag FST is set to "1". Thereafter, the processing proceeds to the Step S18. Accordingly, the drive control command value DUTY is maintained at the second command value DTY2 from the time in which the ignition switch 21 has been turned ON to the time in which the start time TST has elapsed, and thereafter, the processing is switched to the ordinary control.

When the answer of the Step S11 is the negative (NO), namely, before the delay time TDLY elapses from the time when the ignition switch 21 is turned OFF, the processing proceeds to a Step S22, and whether or not the ignition switch 21 was in the ON state at the time of the last execution of this processing is determined. When this answer is the affirmative (YES), the drive control command value DUTY is set to the first stop command value DTY01 (Step S23). When the answer of the Step S22 is the negative (NO), the processing is ended. Accordingly, the drive control command value DUTY is set to the first stop command value DTY01 immediately after the ignition switch 21 is turned OFF, the value is maintained during the operation of the ECU 1.

Figure 6:
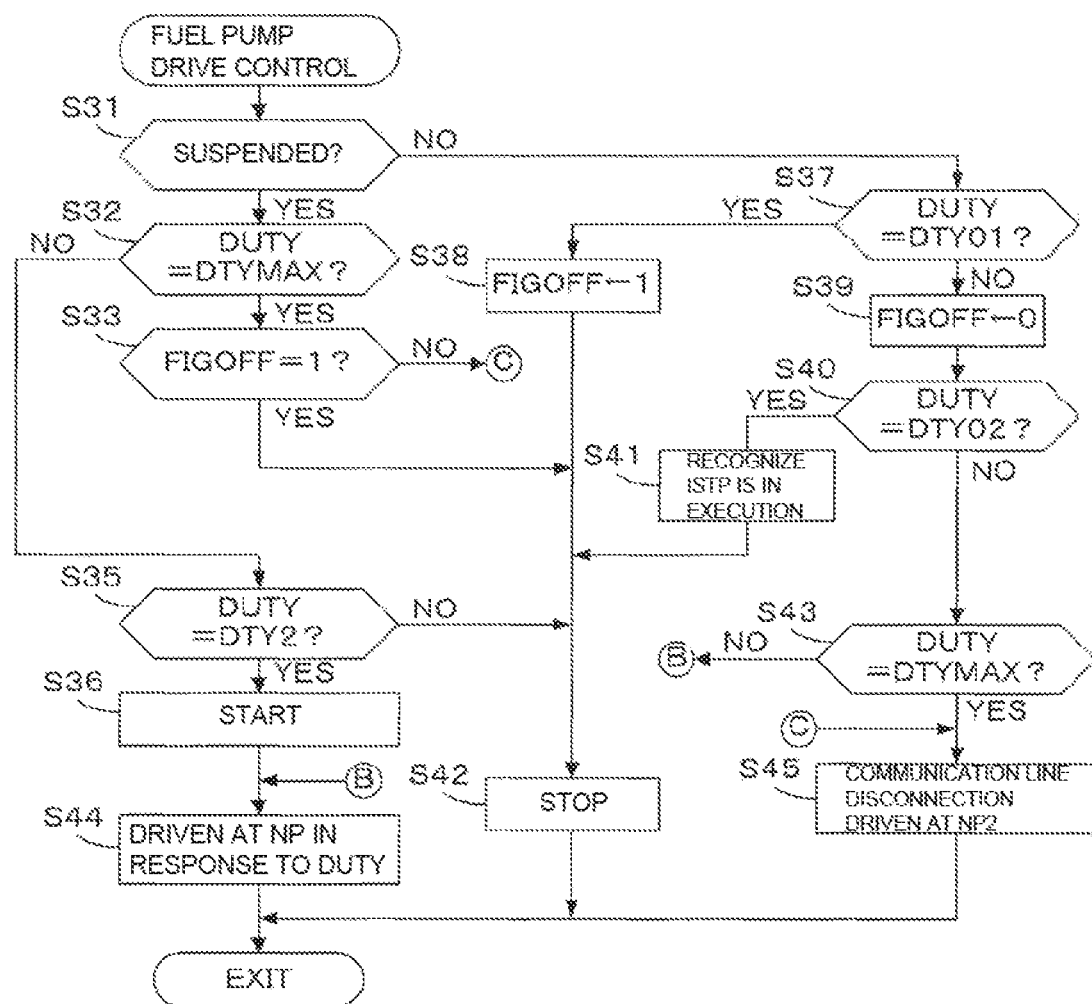
FIG. 6 is a flow chart of the processing for performing the drive control of the fuel pump in response to the drive control command value (DUTY).

FIG. 6 is a flow chart of the processing for performing the drive control of the fuel pump 4 in accordance with the drive control command value DUTY, and this processing is performed in the FPD 2 at every fixed time.

In a Step S31, whether or not the fuel pump 4 is stopped is determined, the answer is the negative (NO), namely, when the fuel pump is in operation, whether or not the drive control command value DUTY is equal to the first stop command value DTY01 (Step S37). When this answer is the affirmative (YES), an IG off flag FIGOFF is set to "1" by recognizing that the ignition switch 21 has been turned OFF (Step S38), and the fuel pump 4 is stopped (Step S42). When the answer of the Step S37 is the negative (NO), the IG off flag FIGOFF is set to "0" (Step S39), and whether or not the drive control command value DUTY is equal to the second stop command value DTY02 is determined (Step S40). This answer is the affirmative (YES), by recognizing that the idling stop is in execution (Step S41), and the fuel pump 4 is stopped (Step S42).

When the answer of a Step S40 is the negative (NO), whether or not the drive control command value DUTY is equal to the maximum command value DTYMAX (=100%) (Step S43) is determined. When this answer is the affirmative (YES), by determining that the communication line 16 has been disconnected, the fuel pump 4 is driven at the second predetermined rotational frequency NP2 (Step S45). When the answer of the Step S43 is the negative (NO), the processing proceeds to a Step S44, and the fuel pump 4 is driven at the rotational frequency NP in accordance with the drive control command value DUTY.

When the fuel pump 4 is not working, the processing proceeds from the Step S31 to a Step S32, and whether or not the drive control command value DUTY is equal to the maximum command value DTYMAX (=100%) like the Step S43 is determined. When the answer is the affirmative (YES), whether or not the IG off flag FIGOFF is "1" is determined (Step S33). When the answer is the affirmative (YES), the stop state of the fuel pump 4 is maintained (Step S42). When the answers of the Steps S32 and S33 are the affirmative (YES), there is a possibility that the ON sticking failure of the fuel pump power source relay 11 occurs. Therefore, in the case of having switched from the Step S33 to the Step S42, the following ON sticking determination processing is executed.

The ECU 1 transmits the drive control command value DUTY which is less than the first command value DTY1, to the FPD 2, a normal condition is determined when having received a return signal showing the stop state from the FPD 2. On the other hand, when having received the return signal showing the operation state from the FPD 2, the ECU 1 determines that the ON sticking failure of the fuel pump power source relay 11 has occurred.

When the answer of the step S33 is the negative (NO), since the ignition switch 21 is in the ON state, it is assumed that, for example, the communication line 16 has been disconnected during execution of the idling stop, and the processing proceeds to the Step S45. Accordingly, the fuel pump 4 which was suspended is started. When the communication line 16 is disconnected, this is because the second command value DTY2 as the start command value cannot be received.

When the answer of the Step S32 is the negative (NO), the processing proceeds to a Step S35, and whether or not the drive control command value DUTY is equal to the second command value DTY2 is determined. When this answer is the negative (NO), the stop state is maintained (Step S42). When the answer of the Step S35 is the affirmative (YES), namely, when the second command value DTY2 which is the start command value is transmitted from the ECU 1, the fuel pump 4 is started and operates the fuel pump 4 at the rotational frequency NP in response to the drive control command value DUTY.

When the fuel pump 4 is stopped via the Step S38 from the Step 37, the answer of the Step S33 becomes the affirmative (YES) even if it is recognized that the drive control command value DUTY is the maximum command value DTYMAX (FIG. 3, a period of the times t2~t3), and the stop state of the fuel pump 4 is maintained. In other words, in the case where the ON sticking failure which continues the ON state of the fuel pump power source relay 11 occurs even if the ignition switch is turned OFF, since the FPD 2 can recognize that the ignition switch 21 has been turned OFF by the first stop command value DTY01, it continues the stop state of the fuel pump 4, and the fuel pump 4 can be prevented from being driven uselessly.

Further, when the disconnection of the communication line 16 has occurred, since the fuel pump 4 is driven at the second predetermined rotational frequency NP2 if the ignition switch 21 is in the ON state, the engine 3 can be prevented from the case where the operation is disabled.

Further, when having determined that the ON sticking failure of the fuel pump power source relay 11 or the disconnection of the communication line 16 occurs, the failure information showing the failure content is stored in a memory of the ECU 1. Thereafter, when confirming the failure information at a store or the like, repairs such as an exchange of the relay or the like are made. The ECU 1 may perform a failure alarm display (such as lighting of an LED) instead of the storage of the failure information or together with the storage of the failure information.

As above, in this embodiment, in the communication interruption state in which the transmission of the drive control command value DUTY from the ECU 1 to the FPD 2 is interrupted, namely, in the case of the disconnection of the communication line 16, the FPD 2 is configured so as to drive the fuel pump 4 by using the maximum command value DTYMAX (=100%) functioning as the specific drive command value, as the drive control command value DUTY. The stop state of the fuel pump 4 is maintained even if the drive control command value DUTY is the maximum command value DTYMAX (FIG. 6, when the answer of Step S32 is the affirmative (YES)) when an ignition switch 21 is in the OFF state so that the fuel pump 4 is stopped, while the fuel pump 4 is driven at the second predetermined rotational frequency NP2 when the ignition switch 21 is in the ON state and when the drive control command value DUTY is the maximum command value DTYMAX. Accordingly, since the fuel pump 4 is driven when the ignition switch 21 is turned ON (FIG. 6, when the answer of the Step 43 is the affirmative (YES) or when the answer of the Step S33 is the negative (NO)) in the case where the drive control command value DUTY is the maximum command value DTYMAX, the state in which the engine 3 cannot be operated can be avoided even if the communication line 16 for transmitting the drive control command value is disconnected. On the other hand, since the stop state of the fuel pump 4 is maintained even if the drive control command value DUTY is the maximum command value DTYMAX (at the time of the ON sticking failure occurrence of the relay 11) when the ignition switch 21 is turned OFF, the useless drive of the fuel pump 4 can be prevented.

Since the drive control command value DUTY is set to the first stop command value DTY01 or the second stop command value DTY02 when stopping the fuel pump 4, and since the second stop command value DTY02 (for example, 15%) when the ignition switch 21 is in the ON state is set to the value different from the first stop command value DTY01 (for example, 10%) when the ignition switch 21 is the OFF state, the FPD 2 can recognize the ON/OFF states of the ignition switch 21 by the values of the stop command value. Therefore, the communication line for a stop command is not required to be provided corresponding to each of the ON/OFF states of the ignition switch 21.

Further, when starting the fuel pump 4 from the stop state, the drive control command value DUTY is set to the second command value DTY2 functioning as the start command value different from the stop command value DTY01, DTY02 and the maximum command value DTYMAX. The starting of the fuel pump 4 can be properly performed by providing such start command value, depending on the situation, even after the stop command has been performed.

Further, since the start command value is the second command value DTY2 that maximizes the rotational frequency NP of the fuel pump 4, the fuel pump 4 can be started with a good responsiveness at the time of starting.

Further, since the FPD 2 can recognize that the ignition switch 21 is in the OFF state when having received the first stop command value DTY01, the useless drive of the fuel pump 4 can be prevented by continuing the stop state of the fuel pump 4 even if the drive control command value DUTY is the maximum command value DTYMAX.

Further, since the drive control command value DUTY is set to the second stop command value DTY02 different from the first stop command value DTY01 when the ignition switch 21 is the ON state and when the engine 3 has been stopped, namely, when an idling stop has been performed, the FPD 2 recognizes that the engine 3 has been stopped temporarily in the ON state of the ignition switch 21 when having received the second stop command value DTY02, whereby to stop the fuel pump 4, so that electrical power consumption can be reduced. Then, it recognizes that the engine 3 is re-started when having received the second command value DTY2 functioning as the start command value which is different from the first stop command value DTY01, the second stop command value DTY02, and the maximum command value DTYMAX, so that the fuel pump 4 can be started simultaneously with the re-start of the engine 3.

Further, since the fuel pump power source relay 11 is provided separately from the ignition switch 21, the ON/OFF states of the power source supply can be controlled without increasing the capacity of electrical current of the ignition switch 21 even in the case where a fuel pump driving current has increased, by forming a motor driving the fuel pump 4 by a brushless motor. As a result, an increase in cost can be avoided. Generally, a circuit configuration in which the ignition switch 21 and the fuel pump power source relay 11 are connected in series, and in which the fuel pump 4 can be stopped by turning the ignition switch 21 off even when the ON sticking failure of the fuel pump power source relay 11 has occurred is adopted. Therefore, in the case where a driving current (fuel pump driving current) of the motor driving the fuel pump 4 has increased, the electrical current capacities of the ignition switch 21 and the fuel pump power source relay 11 are required to be increased. On the contrary, according to the configuration of this embodiment, since the ignition switch 21 is arranged on the outside of an electrical route extending from the battery 8 through the fuel pump power source relay 11 to the FPD 2, the electrical current capacity of the ignition switch 21 is not required to be increased, so that the increase in cost can be avoided.

Further, the present invention is not limited to the above mentioned embodiment, and various modifications may be made. For example, in the above mentioned embodiment, although the first stop command value and the second stop command value were 10% and 15%, respectively, these may be set freely if these are values other than an ordinary range (20%~100%) without being limited to these setting values. However, it is required that these are set to the values different from the specific drive command value in order for determining the disconnection of the communication line 16. Moreover, the starting command value is not limited to the second command value DTY2 which maximizes the rotational frequency NP, and may be configured to start by the condition that the value (which is not limited to one value, any value being contained in an ordinary use range) within the ordinary use range has been transmitted.

The invention claimed is:

1. A control device of a fuel pump for supplying fuel from a fuel tank to an internal combustion engine, the control device comprising:
   a fuel pump driver configured to control supply of electrical power to the fuel pump for driving the fuel pump; and
   an engine control unit configured to
   start and drive the fuel pump when an ignition switch configured to switch connection and disconnection of an electrical power source to the engine control unit is in an ON state and stop the fuel pump when the ignition switch is in an OFF state, thereby controlling the engine, and generate a drive control command value which is transmitted as a drive signal to the fuel pump driver such that operation of the fuel pump is controlled by the fuel pump driver based on the transmitted drive control command value, wherein the fuel pump driver is configured to drive the fuel pump by using a specific drive command value preset as the drive signal when a communication interruption state in which transmission of the drive control command value is interrupted is detected, wherein the stop state of the fuel pump is maintained even when the ignition switch is in the OFF state and the drive signal is set to the specific drive command value, and the fuel pump is driven when the ignition switch is in the ON state and the drive signal is the specific drive command value, and wherein, when stopping the fuel pump, the engine control unit sets the drive control command value to one of different stop command values depending upon the state of the ignition switch such that the one of the stop command values set when the ignition switch is in the ON state is different from another of the stop command values when the ignition switch is in the OFF state.

2. The control device of the fuel pump according to claim 1, wherein, when restarting the fuel pump from the stop state, the engine control unit sets the drive control command value to a start command value which is different from the stop command-values and the specific drive command value.

3. The control device of the fuel pump according to claim 2, wherein the start command value is a command value that maximizes a rotational speed of the fuel pump.

4. The control device of the fuel pump according to of claim 1, wherein the engine control unit sets the drive control command value to a first stop command value immediately after the ignition switch is switched from the ON state to the OFF state, and the fuel pump driver maintains the stop state of the fuel pump when the fuel pump driver receives the first stop command value even when the drive signal has been set to the specific drive command value.

5. The control device of the fuel pump according to claim 4, wherein the engine control unit sets the drive control command value to a second stop command value which is different from the first stop command value when the ignition switch is in the ON state and when the engine is stopped, and thereafter, sets the drive control command value to a start command value which is different from the first stop command value, the second stop command value and the specific drive command value, at the time of the start of the engine, and the fuel pump driver stops the fuel pump upon receiving the second stop command value and, thereafter, starts the fuel pump when upon receiving the start command value.

6. The control device according to claim 1, further comprising:

a fuel pump electrical power source relay configured to be switched ON and OFF in response to the ON/OFF states of the ignition switch, respectively, wherein the ignition switch is arranged between a battery and the engine control unit such that the ignition switch can electrically connect and disconnect the battery and the engine control unit, and the fuel pump power source relay is arranged between the battery and the fuel pump driver such that the fuel pump power source relay can electrically connect and disconnect the battery and the fuel pump driver.

* * * * *